United States Patent [19]
Chou et al.

[11] Patent Number: 5,833,607
[45] Date of Patent: Nov. 10, 1998

[54] AUTOMATIC FULL-LEG MOSAIC AND DISPLAY FOR PERIPHERAL ANGIOGRAPHY

[75] Inventors: Jin-Shin Chou; Jianzhong Qian, both of Princeton Junction, N.J.

[73] Assignee: Siemens Corporate Research, Inc., Princeton, N.J.

[21] Appl. No.: 620,825

[22] Filed: Mar. 25, 1996

[51] Int. Cl.$^6$ ............................................ A61B 6/00
[52] U.S. Cl. ....................... 600/407; 382/130; 382/294
[58] Field of Search ..................... 128/653.1, 653.2, 128/653.3, 654, 920, 922; 378/62, 98.2, 98.3, 98.6, 98.7; 382/130, 132, 294, 266, 275; 600/407, 410, 419, 431

[56] References Cited

U.S. PATENT DOCUMENTS

| | | |
|---|---|---|
| 4,613,983 | 9/1986 | Yedid et al. ............................ 378/99 |
| 5,123,056 | 6/1992 | Wilson ..................................... 382/6 |
| 5,349,625 | 9/1994 | Born et al. ............................. 378/95 |
| 5,394,455 | 2/1995 | Roeck et al. ........................ 378/98.3 |
| 5,485,500 | 1/1996 | Baba et al. .......................... 378/98.2 |
| 5,513,239 | 4/1996 | Mulder . |
| 5,636,259 | 6/1997 | Khutoryansky et al. . |

*Primary Examiner*—Marvin M. Lateef
*Assistant Examiner*—Shawna J. Shaw
*Attorney, Agent, or Firm*—Donald B. Paschburg

[57] ABSTRACT

A computer system automatically takes a sequence of stepping images from peripheral angiography and mosaics them into a single full-leg display by globally matching the bone and the vessel by measuring an overlapping ratio and by locally refining detailed anatomical features using deformation. The system combines multiple evidence in the entire overlapped image/candidate rows and maximizes the ratio of overlap. This approach takes evidence from the multiple rows and provides a more reliable result. In addition, local refinement is applied to compensate for the possible mismatch and nonlinear patient movement.

17 Claims, 8 Drawing Sheets

AUTOMATIC FULL-LEG MOSAIC AND DISPLAY FOR PERIPHERAL ANGIOGRAPHY

BACKGROUND OF THE INVENTION

1. Field of the Invention

The present invention relates to digital peripheral angiography and more particularly to automatically taking a sequence of stepping images from digital peripheral angiography and mosaicing the images into a single display.

2. Description of the Prior Art

In digital peripheral angiography, the image of the lower abdomen and the legs are obtained by stepping a camera sequentially through five to seven locations. This stepping process is necessary due to the limited field-of-view of the camera. For visualization and medical diagnosis purposes, each stepping image gives only a local view while a full-leg display would provide physicians with a global view of the angiogram of the entire legs.

To facilitate the full-leg display, adjacent stepping images are overlapped over each other during the image acquisition. The problem for constructing the full-leg display is decomposed into finding the best match in each adjacent image pair without incurring geometric distortion in both the X and Y directions. By using parameters of the matching results, a full-leg display can be constructed. However, the patient may move during different stepping image acquisition. This makes the matching more difficult.

Currently, in clinical practice, the most frequently used method for creating a full-leg mosaic takes place in two steps. First, a rough overlapping of each pair of images is done according to the mechanical movement parameters of the image device. Second, a manual adjustment is performed according to a technicians visual exam. This makes the development of the full-leg mosaic and the displaying of it, a time-consuming and subjective process.

A computer method is described in U.S. Pat. No. 5,123,056, entitled "Whole-Leg X-Ray Image Processing And Display Techniques", assigned to Siemens Medical Systems, Inc., and issued on Jun. 16, 1992. Two methods of image processing are provided in which the best 5–7 images of the peripheral arteries of a patient are joined together to form a single, continuous image of the legs. In either method, from the geometrical parameters of the image acquisition system, the portions of each image to be removed before joining the remaining portions together are estimated. This estimate is refined using an automatic search for the best match.

In this method, the image matching for joining two adjacent images was formulated as searching the best matching pixel row pair such that the number of overlap pixel rows is determined. Here, the best matching row pair was defined as the minimum row difference which is the summation over the pixels in the candidate row pair, $$\min_i |R_1(i) - R_2(i)|$$

where $R_1(i)$ and $R_2(i)$ are the row pixels after the morphological filtering and i is the index of the row pairs. The problem with this prior art approach is that image matching using only one row of local information cannot provide reliable evidence for determining the best match between image pairs.

SUMMARY OF THE INVENTION

The present invention includes a computer system that automatically takes a sequence of stepping images from peripheral angiography and mosaics them into a single full-leg display. The process is achieved in two phases: global matching of the bone and the vessel by measure of the overlapping ratio and local refinement of the detailed anatomical features using deformation.

The present invention combines the multiple evidence in the entire overlapped image/candidate rows and maximizes the ratio of overlap. This approach takes evidence from the multiple rows and provides a more reliable result. In addition, local refinement is applied to compensate for the possible mismatch and the nonlinear patient movement.

DETAILED DESCRIPTION OF THE INVENTION

Figure 1:
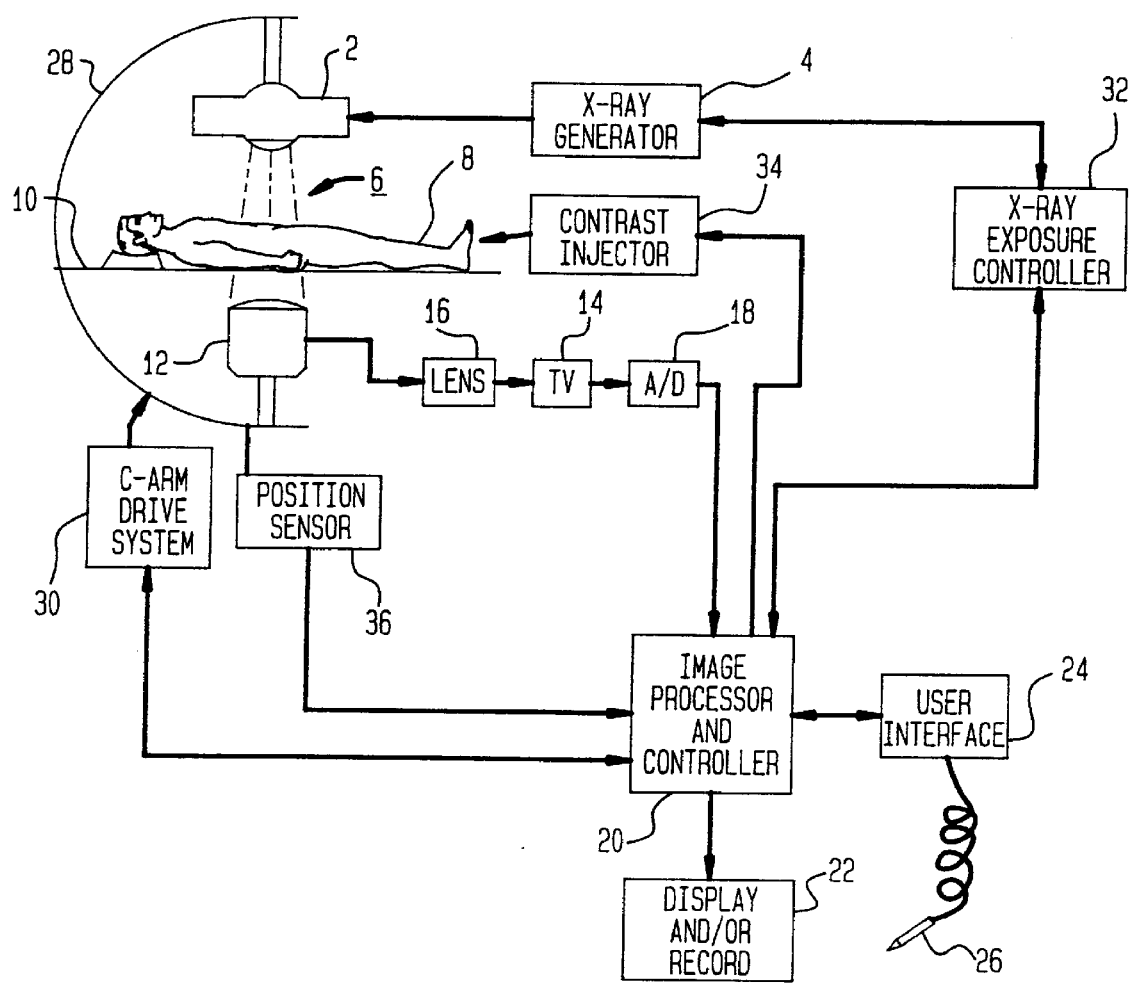
FIG. 1 illustrates a block diagram from an X-ray examination/diagnostic system which processes and displays images in accordance with the present invention.

The X-ray examination apparatus shown in FIG. 1 comprises an X-ray tube 2 which is supplied by an X-ray power generator 4 for generating an X-ray beam 6. A patient 8 is supported on an X-ray table 10 at a position so that the generated X-rays 6 pass through patient 10 and onto an X-ray image intensifier tube 12 located on a side of the patient supporting table 10 which is remote from X-ray tube 2. As well known, the image intensifier tube 12 provides an optical output which is imaged into a television camera 14 by means of a lens system 16. Although the optical output from image intensifier tube 12 would normally be along an axis parallel to the axis of the X-ray beam input, a perpendicular path for the optical output is illustrated solely for the convenience of aiding drawing clarity. The image projected into television camera 14 is converted therein into a video signal. The video signal supplied from camera 14 is then digitized by an analog to digital (A/D) converter 18 and subsequently processed and stored in an image processor and controller 20. A display/record device 22 is used to display and/or record the stored images as, e.g., the result of a digital subtraction examination. A user interface 24 allows a user/operator to control the operation of the X-ray system, as well known. An indicating device, such as a light pen 26 allows the user to identify regions of interest (ROI's) on the display, as also known.

For completing the conventional aspects of the present invention, a known type of C-arm gantry arrangement 28 is provided to move X-ray tube 2 and image intensifier tube 12 in a coordinated manner with respect to the patient support table 10. For this purpose, a high resolution C-arm drive system 30 is provided, as well as an X-ray exposure controller 32. Also a contrast medium injector 34.

That portion of the X-ray examination apparatus including X-ray tube 2, image intensifier tube 12, television camera 14, C-arm gantry 28, patient supporting table 10. C-arm drive system 30, image processor and controller 20, interface 24 and display 22 are all conventional components well known in the art and may comprise, for example, the ANGIOSKOP D33 gantry system and the DIGITRON 3 X-ray image processing and control system, both available from Siemens Medical Systems, Inc., Iselin, N.J. However, the image processor and controller 20 is modified to operate in accordance with the invention, as described herein. Furthermore, the X-ray power generator 4 and X-ray exposure controller 32 are also known and commercially available components, available from, for example, the forenoted Siemens Medical Systems, Inc. under the respective device tradenames of POLYDOROS 100 and DIGIMATIC. Contrast injector 29 may comprise a product available from Medrad Corporation under the trademark MARK V. A final component of the system is a position measuring device 36 for accurately indicating the relative position between C-arm 28 and the patient support table 10. For this purpose, a position measuring device 36 comprises, e.g., a component commercially available from Sony Corporation under their trademark DIGIRULER.

With the present invention, two display types are generated. First, a full leg image is reduced so that it fits on a single display or hardcopy image. The full-leg display may be useful for physician reports to referring physicians, but is probably not useful for diagnosis. Second, a full-resolution image is assembled so that it can be scrolled on a display console, and it is referred to as a partial full-leg display. The partial full-leg display lets the user both concentrate on a problem area that extends over more than one image frame and allows quick association of the image with anatomy. Very often radiologists show images to referring physicians on a video screen. The partial full-leg display provides a fast, convenient way to review the pertinent images.

The full-leg display and partial full-leg display are also useful for controlling the gantry: the operator can point to a region of interest on display 22 using light pen 26, which pointing would cause controller 22 to generate the appropriate signals to command C-arm 8 to center X-ray source 2 at that position. Such systems are known in general, see for example U.S. Pat. No. 4,609,940, incorporated herein by reference. Furthermore, the association and storage of the position information corresponding to each acquired image is also known, e.g., from U.S. Pat. No. 4,613,983, which is also incorporated herein by reference.

Additionally, the full-leg display might be useful for controlling a full-resolution image display. That is, when the operator points at a region of interest, those full-resolution images taken at that position could be called up from the memory (not shown) of controller 20 and displayed.

Figure 2:
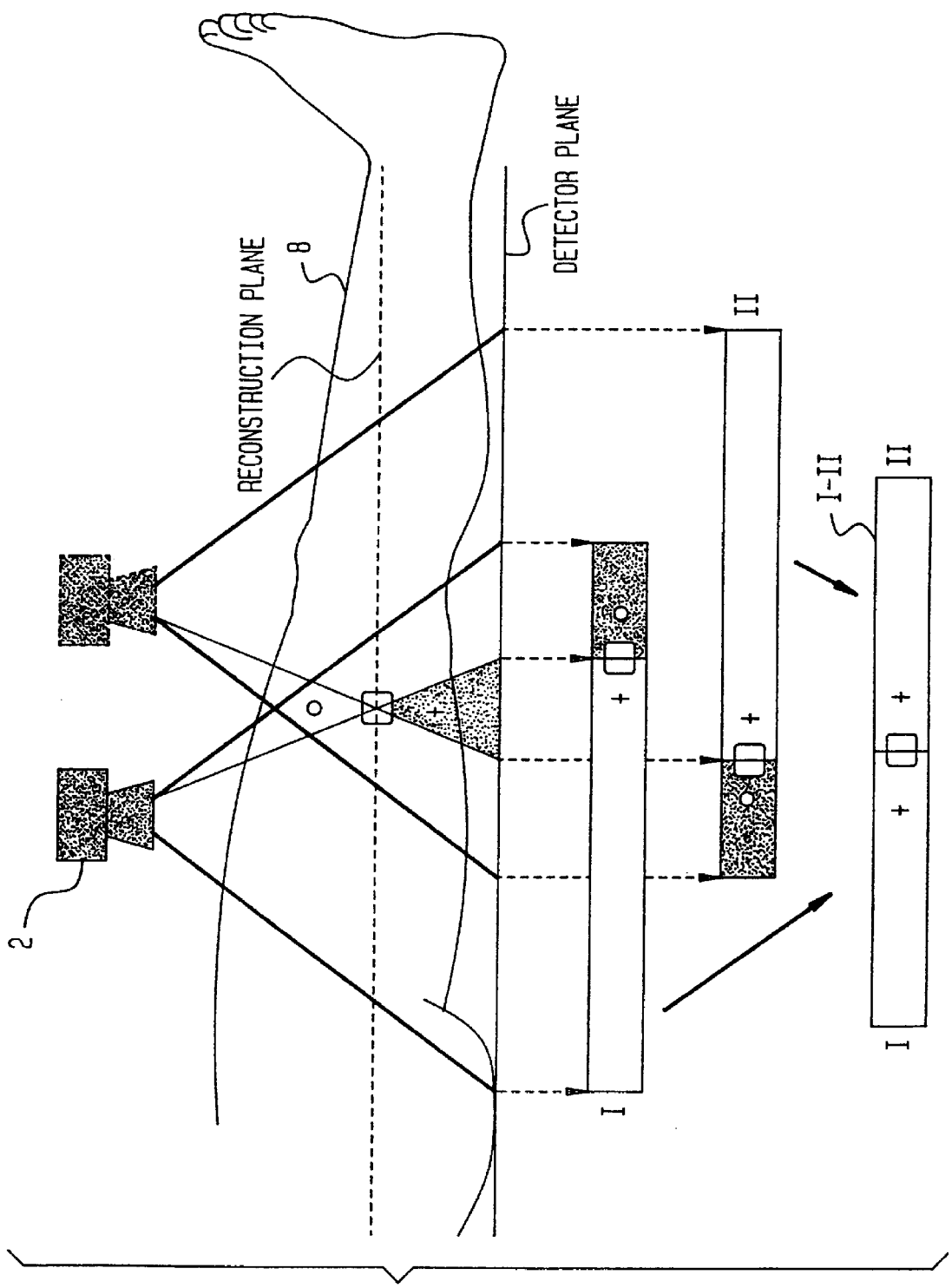
FIG. 2 illustrates image acquisition of two successive positions.

In all cases, images are joined together such that a single plane parallel to the image intensifier, hereafter called the reconstruction plane, is reproduced exactly. In FIG. 2 images are acquired with gantry 28 in two successive positions giving rise to adjoining overlapping images I and II. Images I and II shown in FIG. 2 are representative of an "end" or "side" view of the image, i.e., in a digital system, each of images I and II is actually a series of adjacent end pixels in a two dimensional array of pixels, such as a 1024×1024 array. By removing the proper number of pixel rows from each image and joining the results together, a display image (I–II) is formed that exactly reproduces a planar object in the reconstruction plane. However, this leaves a volume above the reconstruction plane which is never displayed (identified by the o) and a volume below (identified by the +) which is displayed twice.

Figure 3:
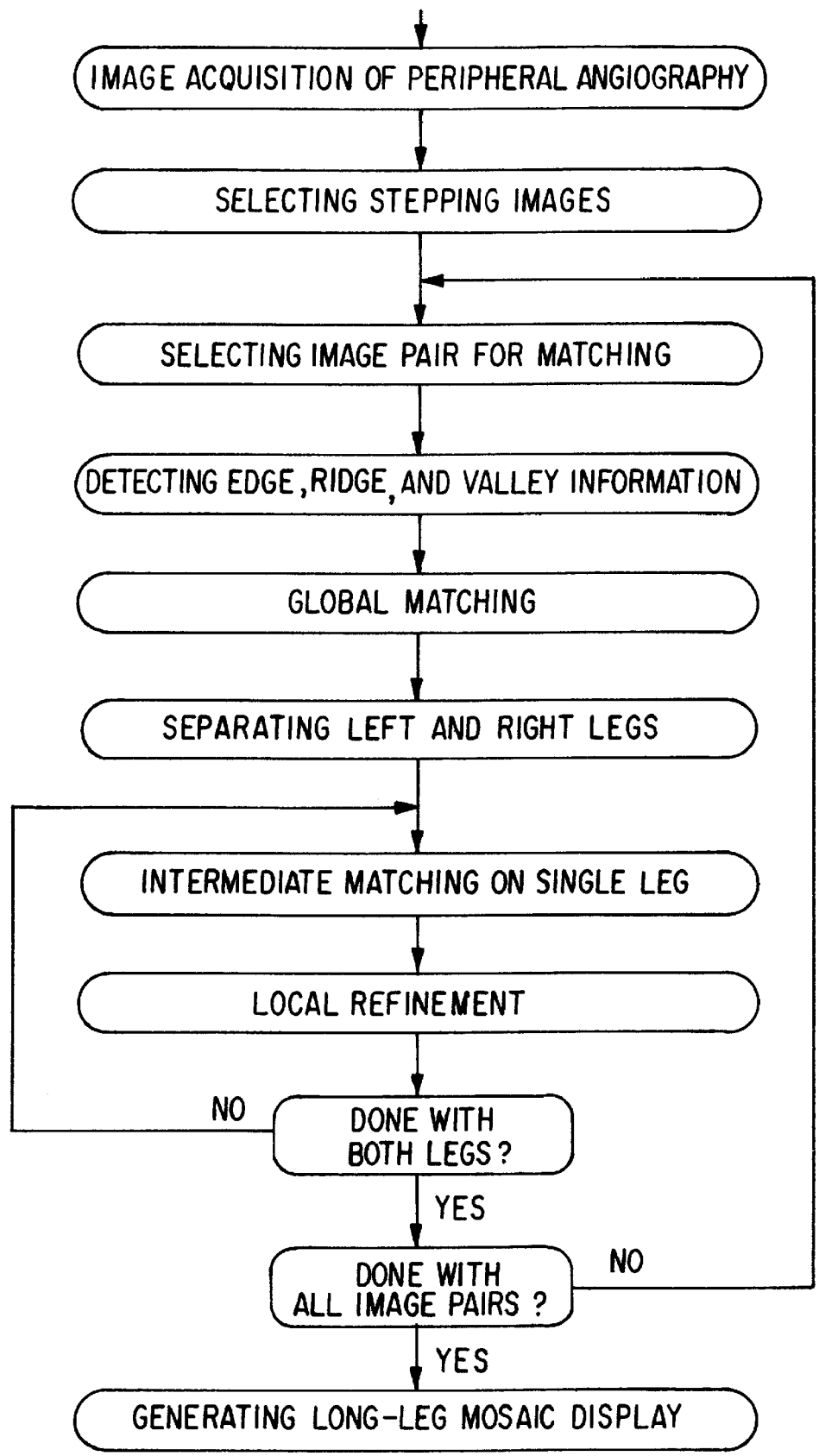
FIG. 3 illustrates a flow diagram of the processing of one embodiment of the present invention.

FIG. 3 illustrates a flow diagram of the processing of one embodiment of the present invention. The processing takes place within image processor and controller 20 of FIG. 1. The processing utilizes the image acquisition of the peripheral angiography described above. The processing then selects the stepping images. The image pair for matching is then selected. Detection of edge, ridge and valley information occurs which is followed by global matching. The images of the left and right legs are then separated and intermediate matching on a single leg takes place. Local refinement occurs and a decision is made as to whether the processing is done with both legs. If the processing is not done with both legs the processing returns the intermediate matching on the single leg. If the processing is done with both legs, a decision is made as to whether the processing is done with all image pairs. If the processing is not done with all image pairs, the processing returns to selecting an image pair for matching. If the processing is done with all image pairs, the processing generates the long-leg mosaic display which is displayed on display and/or record 22 of FIG. 1.

Figure 4:
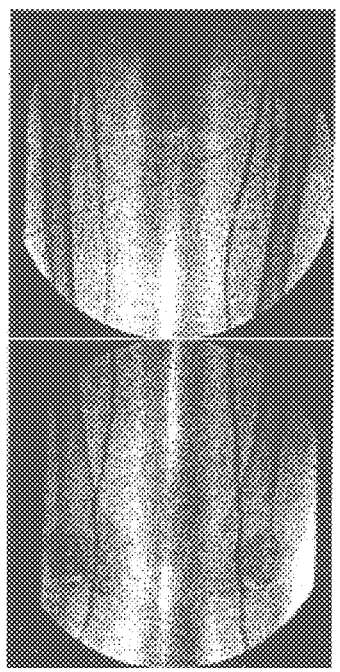
FIG. 4 illustrates the automatic selection of image pairs for matching.
Figure 8:
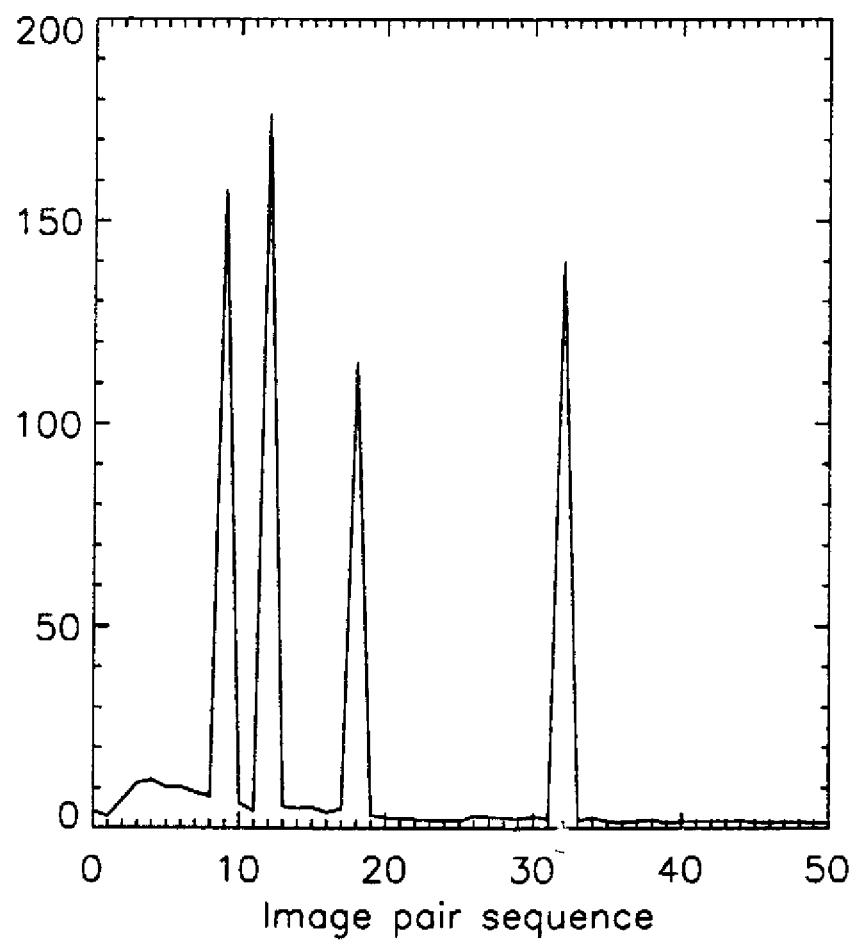
FIG. 8 illustrates a plot of variance of difference (VOD) vs. image pair sequence.

FIG. 4 illustrates the automatic selection of image pairs for matching. As described above, images of peripheral angiography are acquired from the abdomen to the toes, sequentially. A selection criterion of variance of difference (VOD) is used to analyze the degree of change between the adjacent images in the image sequence. The VOD value increases dramatically when the image pairs cover two stepping images. By plotting VOD values vs. the image pair sequence, spikes in the plot represent the transition of the stepping images. This is illustrated in FIG. 8. These particular images will be selected for image matching.

Figure 5:
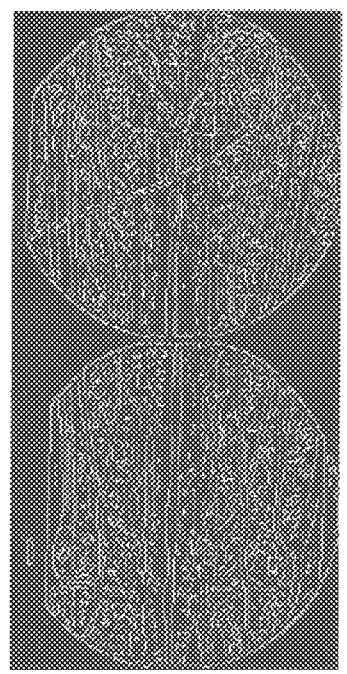
FIG. 5 illustrates generating an edge map by edge detection.

FIG. 5 illustrates generating an edge map by edge detection and extracting directional topographic features such as ridges and valleys.

The following describes initial global matching for each designate image pair. The objective function is to maximize the "ratio of overlap" (RO) in the overlapped area of the image pair. The RO value is defined to measure the degree of matching of anatomical details in the whole overlapping area between two adjacent image pairs. If SM is the similarity measure, E is the edge map, W is the weighting factor, and $\Delta x$, $\Delta y$ are the translational parameters, then the ratio of overlap is defined as follow, $$\max_{\Delta x, \Delta y} \frac{\text{overlap}}{\text{normalization}} = \frac{SM_{12}}{SM_1 + SM_2}$$

where
$SM_{12}(x, y) = \Sigma\Sigma W_1(x, y)E_1(x, y)W_2(x, y)E_2(x, y)$,
$SM_1(x_1, y_1, \Delta x, \Delta y) = \Sigma\Sigma W_1(x_1-\Delta x, y_1-\Delta y)\cdot E_1(x_1-\Delta x, y_1-\Delta y)$,
$SM_2(x_2, y_2, \Delta x, \Delta y) = \Sigma\Sigma W_2(x_2-\Delta x, y_2-\Delta y)\cdot E_2(x_2-\Delta x, y_2-\Delta y)$.

Figure 6:
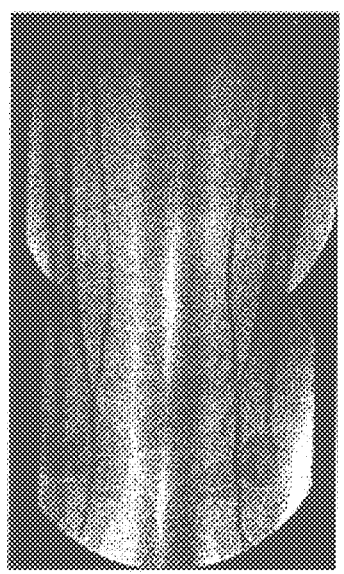
FIG. 6 illustrates the results of matching on image intensity.
Figure 7:
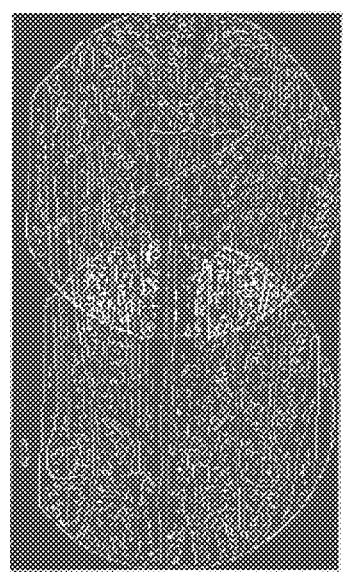
FIG. 7 illustrates the results of matching on image edge maps.
Figure 9:
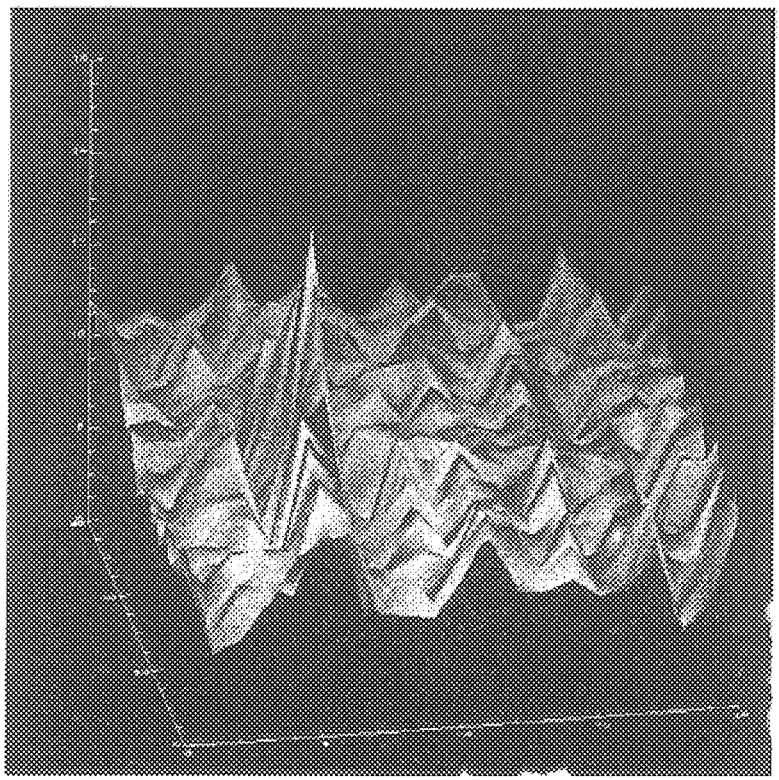
FIG. 9 illustrates the ratio of overlap in the search space.

The definition of the weighting factor can be user-defined, such as,
$W_i(x, y) = 1.0$,
$W_i(x, y) = \alpha$, $W_l(x, y)=1.0-\exp(0.5 \alpha)$
where $\alpha$ is the length of the edge. For example, if $W_l(x, y)=1.0$ then $SM_{12}$ represents the total number of overlapped edge pixels in the selected region. However, it is imperative to use a more complex weighted approach so that the noise points and sporadic edges can be suppressed. FIGS. 6 and 7 show results of the matching on edge maps and images, respectively. FIG. 9 shows an example of the ratio of overlap in the search space. The spike in the image indicates where the optimal matching is.

For intermediate matching, the legs must be separated. The matching parameters for left and right legs may not be consistent due to the patient's motion. Therefore, matching using single leg information will resolve the matching differences. This is done by:

(a) separating the legs by analyzing the image profiles that are perpendicular to the leg direction. This is because both legs possess high intensity values and a dividing line of the legs must lie between these two peaks. One exception is the abdominal image which does not include both legs.

(b) performing single-leg matching by using the steps described in initial global matching for each designate image pair described above.

The following will describe local refinement. The matching parameters obtained from the previous matching process brings the image pair to the proximity of the true matched location. In the case of complex patient movement during the image acquisition, some minor mismatch may occur. Therefore, the following local micro-refinement is needed to adjust for the possible minor mismatching. This is done by:

(a) sub-dividing the optimal overlap region into smaller regions.

(b) computing the Degree of Goodness of Matching (DGM) for each small region according to
RO value of edge map,
the direction of the detected ridge (or valley) line,
the intensity variance along the ridge (or valley) line,
smoothness of edge, ridge, or valley lines.

(c) determining the sub-regions which have a significant low value of DGM.

(d) performing micro-deformations for the regions determined from step (c), by maximizing the value of DGM, so that all detailed anatomical features have the closest mosaic.

Figure 10:
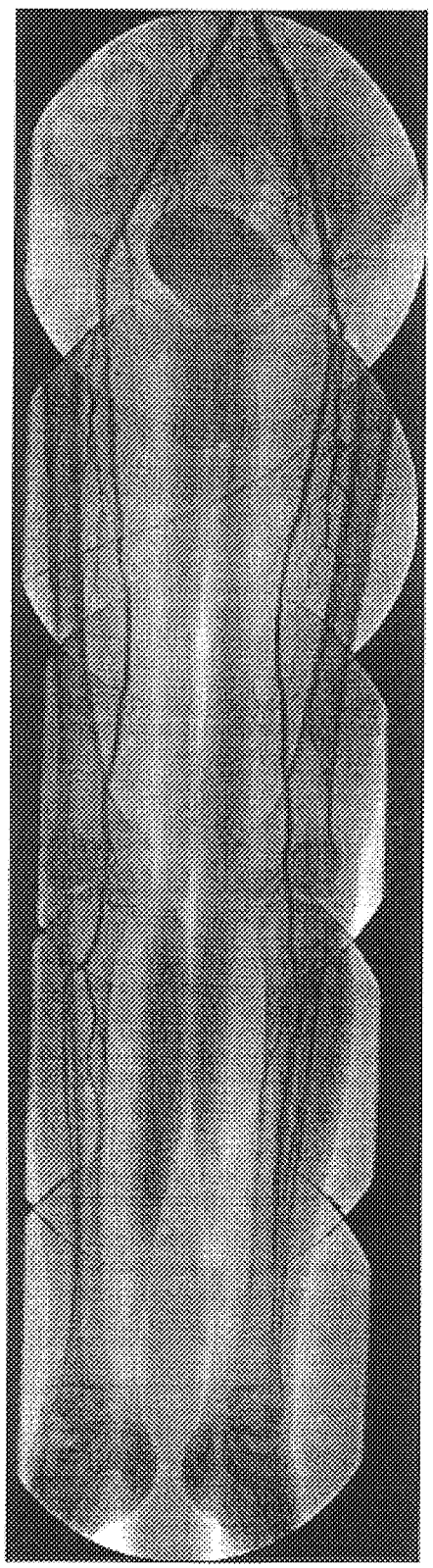
FIG. 10 illustrates an example of a full-leg display.

FIG. 10 illustrates the integration of the matched image pairs into the full-leg display. Based on the matching parameters of the initial global matching for each designate image pair, separating the legs for intermediate matching, and local refinement, a full-leg display can be generated in both low and full resolution.

Figure 11:
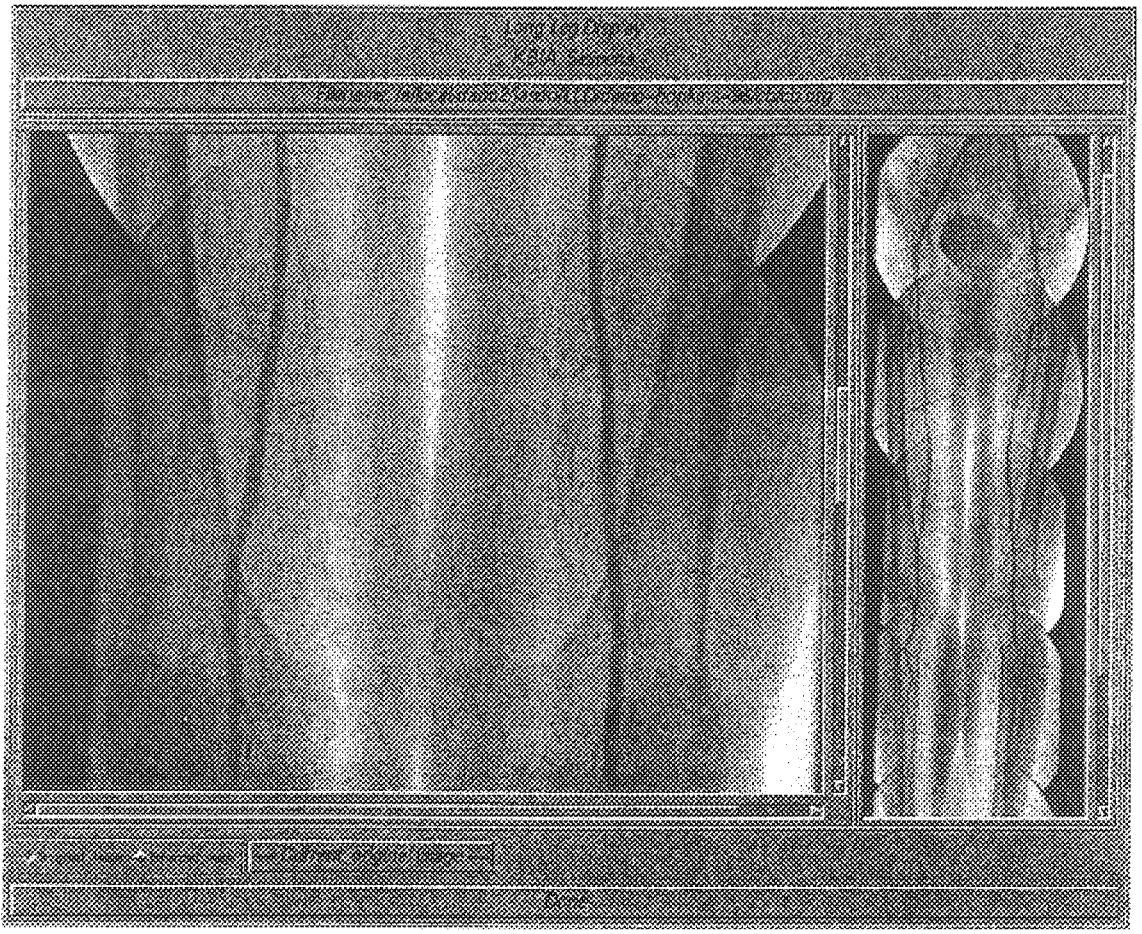
FIG. 11 illustrates an interactive full-leg display in full resolution.

The following will describe displaying the full-leg in full resolution as illustrated in FIG. 11. A full-leg display in full resolution provides near life size visualization but is generally too big to fit into a regular computer screen. On the other hand, a full-leg display in low resolution gives an entire view on the computer screen but could not provide the details the physician generally needs. To take advantage of both, the low-resolution full-leg image is displayed on the right and the partial full-leg display in full resolution is displayed on the left with a "scroll" function provided so that cross referencing can be achieved interactively. This is illustrated in FIG. 11.

It is not intended that this invention be limited to the hardware or software arrangement, or operational procedures shown disclosed. This invention includes all of the alterations and variations thereto as encompassed within the scope of the claims as follows.

We claim:

1. An automatic full-leg mosaic for peripheral angiography comprising:

image acquisition means for automatically taking a sequence of stepping images from peripheral angiography; and, processing means for automatically mosaicing said sequence of images into a full-leg display wherein said processing means comprises:
global matching means for globally matching bones and vessels by measure of a ratio of overlap; and,
local refinement means for compensating for any possible mismatch and nonlinear patient movement.

2. An automatic full-leg mosaic for peripheral angiography comprising image acquisition means for automatically taking a sequence of stepping images from peripheral angiography; and, processing means for mosaicing said sequence of images into a full-leg display wherein said processing means comprises:
global matching means for globally matching bones and vessels by measure of a ratio of overlap; and,
local refinement means for compensating for any possible mismatch and nonlinear patient movement wherein said global matching means comprises:
combination means for combining multiple evidence in entire overlapped image/candidate rows; and,
maximizing means for maximizing said ratio of overlap.

3. An automatic full-leg mosaic for peripheral angiography as claimed in claim 2 wherein said ratio of overlap is defined as $$\max_{\Delta x, \Delta y} \frac{\text{overlap}}{\text{normalization}} = \frac{SM_{12}}{SM_1 + SM_2}$$

where
$SM_{12}(x, y)=\Sigma\Sigma W_1(x, y)E_1(x, y)W_2(x, y)E_2(x, y)$,
$SM_1(x_1, y_1, \Delta x, \Delta y)=\Sigma\Sigma W_1(x_1-\Delta x, y_1-\Delta y)\cdot E_1(x_1-\Delta x, y_1-\Delta y)$,
$SM_2(x_2, y_2, \Delta x, \Delta y)=W_2(x_2-\Delta x, y_2-\Delta y)\cdot E_2(x_2-\Delta x, y_2-\Delta y)$,
and SM is a similarity measure, E is an edge map, W is a weighting factor, and $\Delta x$, $\Delta y$ are translational parameters.

4. An automatic full-leg mosaic for peripheral angiography as claimed in claim 1 wherein said global matching means takes evidence from multiple rows and provides a more reliable result.

5. An automatic full-leg mosaic for peripheral angiography comprising image acquisition-means for automatically taking a sequence of stepping images from peripheral angiography; and, processing means for automatically mosaicing said sequence of images into a full-leg display wherein said processing means comprises:
stepping images selection means;
image pair for matching selection means;
edge, ridge and valley information detection means;
global matching means;
left and right legs separation means;
intermediate matching on a single leg means;

local refinement means;

first decision means for deciding whether said processing is done with both legs;

second decision means for deciding whether said processing is done with all image pairs; and, generating means for generating a long-leg mosaic display.

6. An automatic full-leg mosaic for peripheral angiography as claimed in claim 5 further comprising:

display and/or record means connected to said processing means.

7. An automatic full-leg mosaic for peripheral angiography as claimed in claim 6 further comprising:

user interface means connected to said processing means.

8. An automatic mosaic comprising:

image acquisition means for automatically taking a sequence of stepping images;

processing means connected to said image acquisition means for automatically mosaicing said sequence of images into a display; and, display means connected to said processing means for displaying said mosaic wherein said processing means comprises:

global matching means connected to said image acquisition means for globally matching bones and vessels by measure of a ratio of overlap; and, local refinement means connected to said global matching means for compensating for any possible mismatch and nonlinear patient movement.

9. An automatic mosaic comprising image acquisition means for automatically taking a sequence of stepping images;

processing means connected to said image acquisition means for mosaicing said sequence of images into a display; and, display means connected to said processing means for displaying said mosaic wherein said processing means comprises:

global matching means connected to said image acquisition means for globally matching bones and vessels by measure of a ratio of overlap; and, local refinement means connected to said global matching means for compensating for any possible mismatch and nonlinear patient movement wherein said global matching means comprises:

combination means connected to said image acquisition means for combining multiple evidence in entire overlapped image/candidate rows; and, maximizing means for maximizing said ratio of overlap, wherein said ratio of overlap is defined as $$\max_{\Delta x, \Delta y} \frac{overlap}{normalization} = \frac{SM_{12}}{SM_1 + SM_2}$$

where $SM_{12}(x, y) = \Sigma\Sigma W_1(x, y)E_1(x, y)W_2(x, y)E_2(x, y)$, $SM_1(x_1, y_1, \Delta x, \Delta y) = \Sigma\Sigma W_1(x_1 - \Delta x, y_1 - \Delta y) \cdot E_1(x_1 - \Delta x, y_1 - \Delta y)$, $SM_2(x_2, y_2, \Delta x, \Delta y) = \Sigma\Sigma W_2(x_2 - \Delta x, y_2 - \Delta y) \cdot E_2(x_2 - \Delta x, y_2 - \Delta y)$, and SM is a similarity measure, E is an edge map, W is a weighting factor, and $\Delta x$, $\Delta y$ are translational parameters.

10. An automatic mosaic comprising:

image acquisition means;

processing means for automatically mosaicing a sequence of images; and display means wherein said processing means comprises:

stepping images selection means connected to said image acquisition means;

image pair for matching selection means connected to said stepping images selection means;

edge, ridge and valley information detection means connected to said image pair for matching selection means;

global matching means connected to said edge, ridge and valley information detection means;

local refinement means connected to said global matching means;

decision means connected to said local refinement means; and, generating means connected to said decision means for generating a mosaic display for said display means.

11. An automatic mosaic as claimed in claim 10 further comprising:

user interface means connected to said processing means.

12. A method for creating an automatic full-leg mosaic for peripheral angiography comprising the steps of:

automatically taking a sequence of stepping images from peripheral angiography; and, automatically processing said images into a mosaic of a full-leg display wherein automatically processing said images comprises the steps of:

globally matching bones and vessels by measuring an overlapping ratio; and, locally refining for compensating for any possible mismatch and nonlinear patient movement.

13. A method for creating an automatic full-leg mosaic for peripheral angiography comprising automatically taking a sequence of stepping images from peripheral angiography; and, processing said images into a mosaic of a full-leg display wherein processing said images comprises the steps of:

globally matching bones and vessels by measuring an overlapping ratio; and, locally refining for compensating for any possible mismatch and nonlinear patient movement wherein globally matching comprises the steps of:

combining multiple evidence in entire overlapped image/candidate rows; and, maximizing a ratio of overlap.

14. A method for creating an automatic full-leg mosaic for peripheral angiography as claimed in claim 12 wherein globally matching comprises the steps of:

taking evidence from multiple rows; and, providing a more reliable result.

15. A method for creating an automatic full-leg mosaic for peripheral angiography as claimed in claim 12 further comprising the steps of:

displaying said full-leg mosaic; and, recording said full-leg mosaic.

16. A method for creating an automatic full-leg mosaic for peripheral angiography as claimed in claim 15 further comprising:

interfacing processing means with a user.

17. A method for creating an automatic full-leg mosaic for peripheral angiography comprising the steps of automatically taking a sequence of stepping images from peripheral angiography; and, processing said images into a mosaic of a full leg display; wherein processing said images comprises the steps of:

selecting stepping images;
selecting an image pair for matching;
detecting edge, ridge and valley information;
performing global matching;
separating left and right legs;
performing intermediate matching on a single leg;
performing local refinement;
deciding whether said processing is done with both legs and if said processing is not done with both legs, returning to the step of performing intermediate matching on a single leg;
deciding whether said processing is done with all image pairs and if said processing is not done with all image pairs, returning to the step of selecting an image pair for matching; and,
generating a long-leg mosaic display.

* * * * *